United States Patent
Fu et al.

(10) Patent No.: US 9,473,665 B1
(45) Date of Patent: Oct. 18, 2016

(54) PHOTO IMAGING SYSTEM INCLUDING CARRIAGE AND AUTOMATIC IMAGE DETECTION

(71) Applicant: YesVideo, Inc., Santa Clara, CA (US)

(72) Inventors: Sai-Wai Fu, Los Altos Hills, CA (US); Rolf Breuer, Cupertino, CA (US); Christian Collins, San Francisco, CA (US); Cris Delos Reyes, Sunnyvale, CA (US); Eric Muzzi, Santa Cruz, CA (US)

(73) Assignee: YesVideo, Inc., Santa Clara, CA (US)

( * ) Notice: Subject to any disclaimer, the term of this patent is extended or adjusted under 35 U.S.C. 154(b) by 0 days.

(21) Appl. No.: 14/828,982

(22) Filed: Aug. 18, 2015

Related U.S. Application Data

(63) Continuation of application No. 13/794,114, filed on Mar. 11, 2013, now Pat. No. 9,118,787.

(60) Provisional application No. 61/671,392, filed on Jul. 13, 2012.

(51) Int. Cl.
  *H04N 1/00* (2006.01)
  *H04N 1/04* (2006.01)

(52) U.S. Cl.
  CPC ............... *H04N 1/04* (2013.01); *H04N 1/001* (2013.01)

(58) Field of Classification Search
  None
  See application file for complete search history.

(56) References Cited

U.S. PATENT DOCUMENTS

| | | | |
|---|---|---|---|
| 2004/0027547 A1* | 2/2004 | Stemmle | G03B 27/32 355/25 |
| 2008/0300996 A1* | 12/2008 | Fei | G06Q 30/0601 705/26.8 |
| 2009/0002686 A1* | 1/2009 | Voges | G01N 21/94 356/73 |
| 2009/0021798 A1* | 1/2009 | Abahri | H04N 1/195 358/474 |
| 2009/0180085 A1* | 7/2009 | Rieck | G03B 27/52 355/25 |
| 2011/0299128 A1* | 12/2011 | Mestha | H04N 1/6025 358/3.26 |
| 2012/0062757 A1 | 3/2012 | Schindler | |
| 2013/0182139 A1* | 7/2013 | Brunner | G06K 9/3208 348/222.1 |

\* cited by examiner

*Primary Examiner* — Andrew H Lam
(74) *Attorney, Agent, or Firm* — Fish & Richardson P.C.

(57) ABSTRACT

This disclosure provides a self-contained imaging device that takes digital photographs of portions of documents (such as photos or photoalbums) instead of scanning those images. The imaging device uses a lens to zoom in on specific portions of the document that represent images that are to be digitized. Generally speaking, disclosed embodiments utilize a physical device having a housing, a location for retaining or holding an image to be imaged, such as a platen or image conveyance mechanism, a light source and the imaging system (which can be a digital camera). The disclosed device camera provides a low-cost mechanism that can at-once capture a high resolution image without the delays associated with most scanners.

20 Claims, 6 Drawing Sheets

PHOTO IMAGING SYSTEM INCLUDING CARRIAGE AND AUTOMATIC IMAGE DETECTION

CROSS-REFERENCE TO RELATED APPLICATIONS

This is a continuation of U.S. application Ser. No. 13/794,114, filed on Mar. 11, 2013, which claims the benefit of priority under 35 U.S.C. §119(e) of U.S. Provisional Application No. 61/671,392, filed on Jul. 13, 2012. The disclosures of the prior applications are considered part of and are incorporated by reference in the disclosure of this application.

BACKGROUND

Many people have family photos, newspaper clippings and other archives they wish to digitize, so that they may preserve these things indefinitely. To service this need, businesses have developed that specialize in volume digitization of these materials, often providing the individual ("consumer") with an optical disc (CD, DVD, BD) or other digital storage containing digitized files. Services provided by these businesses are typically expensive; that is, these photos, clippings and other archives typically vary greatly in physical size and image quality, necessitating a highly manual process or undesirable image quality. In addition, it may be cumbersome to physically remove photos mounted on photoalbum pages, and therefore, it is conventional when scanning photo albums to scan each page separately (using a fixed resolution), instead of each photograph. While book scanners can also be used, these scanners are typically designed for pages of uniform size and are not geared to high quality image duplication (e.g., color image duplication). Generally speaking, scanner technology represented by these processes tends to be slow, which also drives up cost.

Several further general problems characterize these services. First, because scanning large volumes of dissimilar materials (including photoalbum pages) typically requires extensive manual effort, photos and other materials are typically physically shipped to a location where this will be performed; this type of shipping is often performed on a transparent basis, e.g., a photo shop might hire a subcontractor service provider to perform these digitization services, with turnaround time being weeks or months, and both this delay (and the transparent outsourcing and related privacy issues) may be undesirable. Second, some consumers may require higher quality digitization for select images; unfortunately, quality is difficult to understand in this context, i.e., scanning services are typically associated with a quality metric of dots-per-square-inch ("DPSI"). The difficulty in understanding this metric makes making it difficult for consumers to comprehend tradeoffs between quality levels and associated pricing. For example, a first photo having small physical size and scanned at relatively high resolution may have quality inferior to a second, larger-size photo scanned at relatively low resolution. Third, related to this problem, it may be difficult for conventional scanner technology to produce an image quality that is high enough to meet consumer requirements.

What is needed is a digitization technology that addresses the aforementioned problems.

Figure 1:
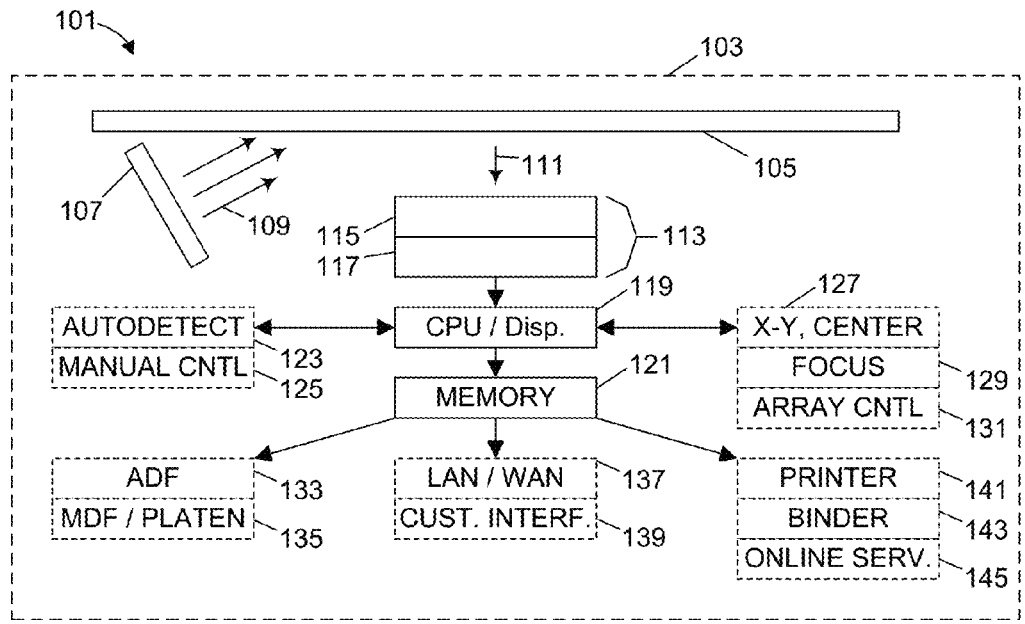
FIG. 1 is an illustrative diagram of an imaging system.

The invention defined by the enumerated claims may be better understood by referring to the following detailed description, which should be read in conjunction with the accompanying drawings. This description of one or more particular embodiments, set out below to enable one to build and use various implementations of the invention or inventions set forth by the claims, is not intended to limit the enumerated claims, but to exemplify their application.

DETAILED DESCRIPTION

Introduction

The description set out below exemplifies an imaging product, service and method (e.g., adapted for home, retail store or service provider use) that takes digital photographs of images instead of scanning those images. Generally speaking, embodiments presented below utilize a physical device having a housing, a location for retaining, holding or otherwise mounting an image to be digitized, such as a platen or image conveyance mechanism, a light source and an imaging system. Instead of an image scanner with a fixed "dots per inch" output, the imaging system is predicated on a digital camera or other equivalent device (i.e., having an image capture component and lens/focus capability) that produces a fixed resolution of megapixels that consumers easily understand. The digital camera provides a low-cost mechanism that can at-once capture a high resolution image without the delays associated with most scanners.

Optionally, the imaging product is configured as a kiosk adapted for in-store use, particularly for retail chains which implement a regional image digitization program or participate with one or more service providers which provide image processing services. Optionally, such a kiosk includes imaging software and a LCD screen which provides previews of captured images, and allows a consumer (or retail store employee) to select desired quality levels and other services. Examples of these services and capabilities will be provided below.

It should be appreciated that using a digital camera or equivalent mechanism (e.g., CCD or CMOS imaging chip and lens mechanism) provides for quick image capture. This usage also facilitates capturing only select images in a manner typically not requiring removal from a compilation. For example, for a consumer that wishes to digitize images in a photo album, the imaging system permits quick image capture and display of each album page or any desired component thereof. Advantageously, the imaging product (e.g., kiosk) may be equipped with a drive mechanism that provides relative movement between the target image and the optical axis used for image capture, by moving the target image, part or all of a lens assembly, or the image capture system itself. In one embodiment, a digital camera is mounted to a carriage that provides for x-y coordinate movement within the housing, to permit the digital camera to move relative to any desired image; once in place, the lens is controlled so as to select only the image for which digitization is to be desired. To support such a drive system, the imaging product includes a CPU and control software sufficient to generate preview images, enable image selection, and trigger high quality image capture; in one contemplated implementation, this software also includes (i) automatic image identification software, (ii) software that controls the imaging product (e.g., moves the camera) to automatically focus in on and capture identified target images, (iii) image processing software to generate "clean" images, for example, with appropriate balance and color correction, and other enhancement, and (iv) software implementing a user interface for consumer selection of options. More details regarding specifically contemplated embodiments will be presented below.

The imaging product introduced above provides a number of advantages relative to conventional scanning products. First, it provides a low-cost, small footprint mechanism that can be distributed for retail or home use. Second, it provides for image digitization services where a consumer can have photos or other materials digitized in real-time, that is, without having to send personal and valuable materials to an unknown third part for weeks at a time; whereas scanners can take minutes per page, the disclosed technology is near instantaneous. Third, the technology permits bundling of additional services such as local hardcopy print, custom book or photoalbum publication, and other features. Fourth, it provides a mechanism where photoalbums and other compilations can be easily imaged to produce high quality images without painstaking labor associated with manually removing images from the album or other compilation. And fifth, conventional scanners also often provide a limited depth of field, typically less than 0.5 inch; via the use of lens-based optics, the technology presented by this disclosure can accommodate varying depths of field.

FIG. 1 is an illustrative diagram of an imaging system 101. The imaging system is a self-contained unit having a housing 103, a conveyance path or target location where hardcopy materials are to be imaged 105, a light source 107, and an imaging system 113. The imaging system can be a digital camera, comprising a digital image capture device (such as a CCD, CMOS imaging chip or other mechanism) and a lens or other zoom and focus mechanism 115. The light source directs light onto the material to be imaged at an angle that will not cause substantial reflection or glare at the point of image capture, as indicated by arrows 109. The lit image is then captured along an optical axis, represented by arrow 111.

Control over the various components, including optional automated image identification, segmentation and capture (including focus and zoom) is provided by a CPU, optionally accompanied by a display unit (represent by the acronym "Disp") 119. In one embodiment, the imaging system can be a commercial, standalone digital camera (itself having a CPU and control software) and the CPU/Display 119 can provide system level control and automation over the digital camera via a control port of the camera. The imaging system includes on board memory, such as DRAM or nonvolatile memory (e.g., flash memory) 121. This on-board memory is used to store captured, digitized images, at least on a transitory basis; in one embodiment, the imaging product comprises at least two gigabytes of such memory.

FIG. 1 also shows various optional features, represented by dashed lines, provided by the CPU/display system 119. For example, as indicated, control software for the imaging product can provide for auto-image detection (123); consumers or store employees can also be provided with manual control (125) over the image capture process, for example, by using the CPU/display system 119 to identify, zoom-in on, crop, and otherwise select a suitable target image. In addition, the CPU/display system 119 in one embodiment also controls a drive system that provides the relative movement introduced earlier, by permitting selection of different images for example within a photoalbum, by x-y variation (127) of the optical axis via which a target image will be captured. As indicated, the CPU can also provide for provide for zoom and autofocus capabilities (129) and control over the imaging device (e.g., array control), for example, to select different quality levels (megapixels) and so forth (131).

To further enhance rapid digitization services, the imaging product can also include an automatic document feeder (133) or a manual document feeder or platen unit (135). These features will be discussed further below, but it should be noted that the use of automatic image identification and capture, coupled with an automatic feeder system that accommodates photos, photoalbum pages and other forms of "compilations," provides for rapid, high-volume, high quality image capture services. If desired, these features can be blended with online services. For example, in one contemplated implementation, imaging products such as represented by FIG. 1 (e.g., kiosks) can be distributed in retail stores, with digitized images being stored "in the cloud;" that is, a consumer can digitize images such as family photos, keep those images, and receive a URL where digital copies are stored as part of a receipt. The consumer can then, via the internet, either immediately or at a later time, select, delete and modify services. To this end, the imaging product itself can be designed to have built-in LAN or WAN capabilities (137) and can have a customer interface (139) that provides for direct ordering of services and/or network connectivity. Finally, as indicated by numerals 141, 143 and 145, in some embodiments, the imaging product can have a built-in printer to locally print hard copy images such as photos, binding and publishing hardware, for example to enable a consumer to create and print custom, bound photoalbums, or provide other on-line services.

Figure 2:
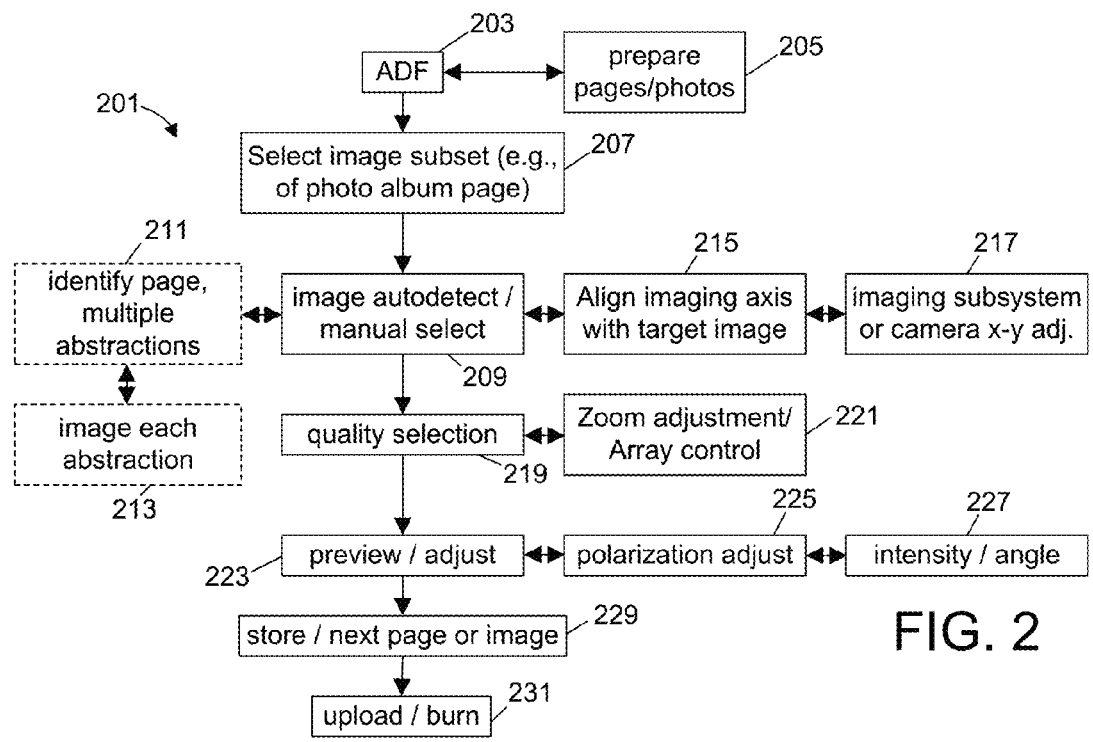
FIG. 2 is a diagram that illustrates methods associated with the imaging system of FIG. 1.

FIG. 2 is a diagram 201 that illustrates methods associated with the imaging system of FIG. 1. In particular, an automated document feeder 203 can be used to assist with the preparation 205 of photos, photoalbum pages or other materials that are to be imaged. Via a display device, a consumer or retail store employee selects photos or pages that are to be imaged, per numeral 207. If desired, the imaging system as introduced above can provide for automatic image detection or, alternatively, can provide for manual image selection, per numeral 209. If an automated image detection is used, then as indicated by dashed line (optional) blocks 211 and 213, software can be configured to automatically capture images at multiple levels of abstraction (e.g., page, section of page, image within page, text and image within section of page, image within image, and so forth). As indicated by numerals 215 and 217, an imaging system is automatically controlled to vary the axis of image capture selectively in "x" and "y" directions, to thereby select specific images within a document; the image capture device (e.g., a digital camera) then zooms in on and captures only the selected images, effectively normalizing that image to the abilities of the image sensor. This selection may be enhanced by providing for variable quality selection, and manual control over zoom adjustment provided by the lens of the imaging system, as represented by numerals 219 and 221. For example, a consumer may wish to have a hardcopy photo translated into a "10 megapixel" image—the imaging product and its associated control software may be configured so as to permit selection of a specific quality level (e.g., 10 megapixels) with associated control over the amount of data captured and/or the camera zoom. Alternatively, quality can be controlled post-capture, e.g., by capturing a high resolution image, and then downscaling image quality to the desired resolution.

Numerals 223, 225 and 227 refer to optional features that may be provided for either the consumer or trained personnel (e.g., in-store personnel assigned to operate an imaging kiosk). First, as mentioned, a display (e.g., an LCD) can be used to preview captured images and make adjustments. As will be further explained below, the imaging system can also provide polarization control, for example, to eliminate glare, or for adjustment of light intensity, color or angle. Provision of these features permits use of an imaging product (such as introduced with reference to FIG. 1) by photo specialty shops, which can provide experience-based, enhancement services that are complementary to the capabilities of the imaging product.

Once the imaging process is completed for a page, photo, or other compilation, the ADF 203 is then used to position a next set of images for image capture, and the process then repeats per numeral 229. When there are no more images to be captured, the entire digitization project can be uploaded or burned to local media, per numeral 231. For example, the project can be uploaded to a "cloud-based" service, as mentioned previously, or the imaging kiosk can be bundled with an optical disc (CD, DVD, BD) recorder, or other means for transferring digitized images to tangible, non-transitory media, e.g., for the consumer to take home.

Figure 3A:
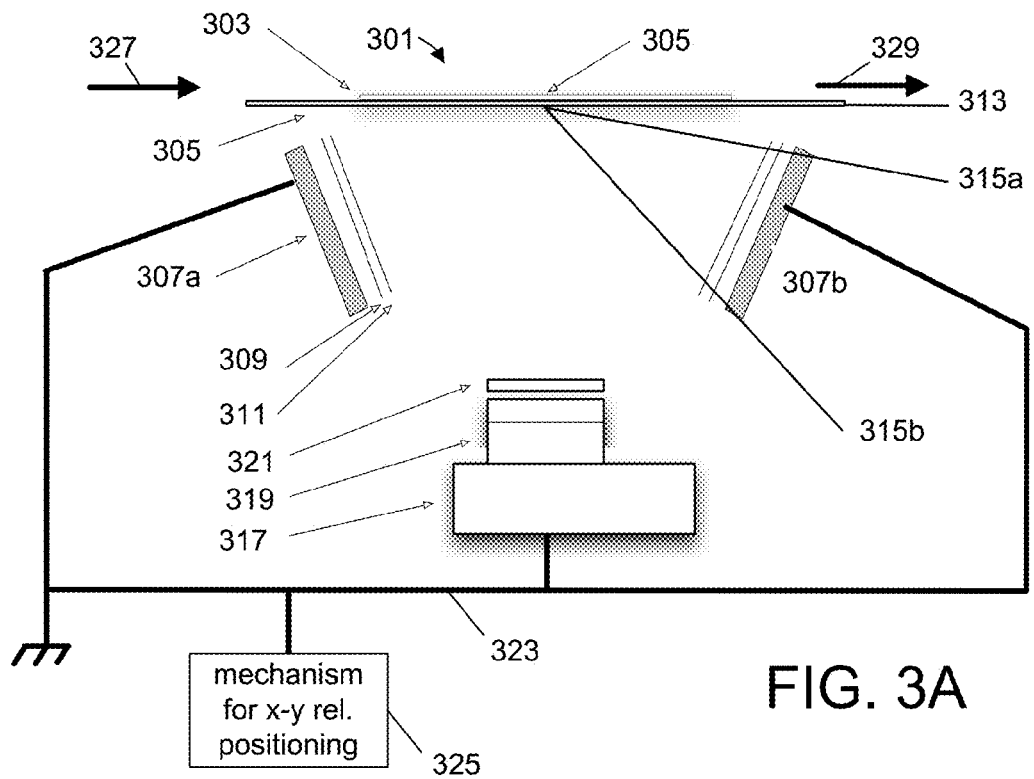
FIG. 3A shows imaging components of the imaging system of FIG. 1.

FIG. 3A shows a detail view of one embodiment 301 of an imaging system. Notably, many photo albums hold photos in place with a clear film that cover each entire page. Over time (e.g., years), this film wrinkles and develops a wavy surface that creates unwanted reflections when the album page is photographed (e.g., using a flash or another light source). As it is often desired to avoid removing individual photos from the page, the embodiment seen in FIG. 3A provides a mechanism to reduce or completely eliminate reflections caused by the above mentioned transparent film.

The embodiment 301 of FIG. 3A employ a controlled light source, provides polarization control and uses a diffuser, as discussed below. As with the embodiments discussed above, this embodiment includes a platen or other retention mechanism defines a plane of image capture; in the case of FIG. 3A, it should be assumed that a transparent surface such as the film just mentioned is present, represented by numeral 303. This film partially or entirely covers a target image, represented by numeral 305. The target image is illuminated by two LED array light sources 307a/307b.

A diffuser 309 in front of the light source 307a/307b is used to avoid hot spots and sparkle artifacts entering the camera lens 319. Pointed light emanating from individual light sources in the LED arrays 307a/307b is therefore spread out over a wide area, eliminating hotspots. In addition, the light source is controlled for angle of incidence. Placing the light source 307a/307b at a certain angle measured from the center of the target image 305 at the side of the imaging area reduces the chance of reflections off the wavy film surface entering the camera lens 319. FIG. 3 shows this angle being between a minimum of 10 degrees (315a) and a maximum of 45 degrees (315b), with numeral 313 representing a zero angle of incidence.

A first polarizing filter 311 is placed just in front of the light source 307a/307b and a complementary second polarizing filter 321 is also placed just in front of the camera lens 319. The second filter 321 is rotated to "dial-out" reflections. This polarization scheme can be set at time of manufacture, or can be made adjustable during operation, e.g., using electromechanical actuation that is either automatically controlled by the CPU (from FIG. 1) or from a user-interface on the outside of the imaging product.

As noted by numerals 323 and 325. In one embodiment, the LED arrays 307a/307b can be mounted to a chassis 323 (e.g., within a housing of the imaging device, along with the image capture device 317), with the chassis being driven to selectively vary the optical axis in "x" and "y" coordinates so as to effect image selection and capture. That is, a digital camera (represented by elements 317, 319 and 321) can be mounted in fixed relation to the light sources with all of these things being moved to accommodate each image in a document (e.g., on a photoalbum page) to effectuate high quality image capture. A first, low resolution of a document (e.g., a photoalbum page) can be taken and used for image identification, with the camera and light source then being automatically and sequentially moved to each location to capture each image as desired. As indicated by arrows 327 and 329, a document feeder (automatic or manual) can permit feeding of photoalbum pages or other materials that are to be digitized.

Figure 3B:
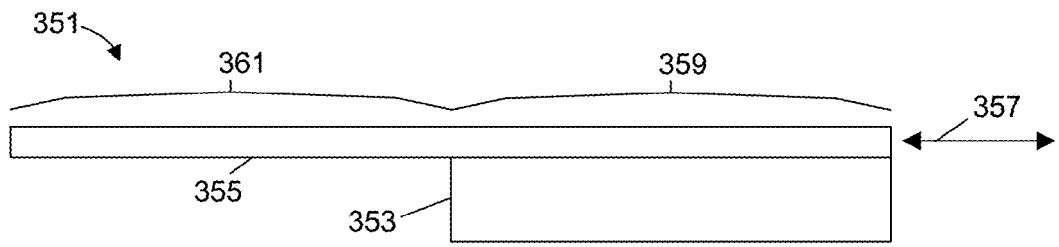
FIG. 3B shows an alternative document feed mechanism in a first position.
Figure 3C:
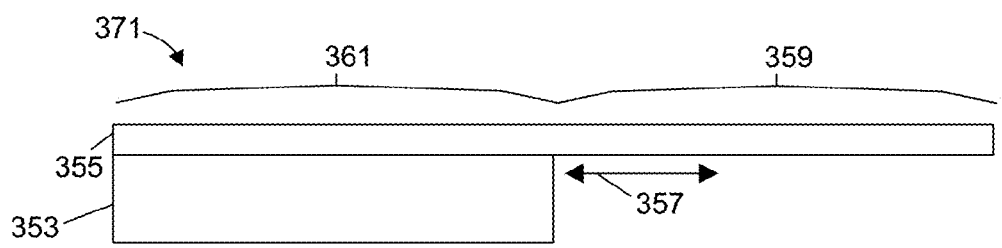
FIG. 3C is a diagram illustrating the alternative document feed mechanism of FIG. 3B in a second position.

FIGS. 3B and 3C are illustrative diagrams showing an alternative document feed mechanism, in first and second positions, respectively. That is, FIGS. 3B and 3C show a document feed mechanism that permits a first set of multiple target images to be automatically captured as indicated above; while those images are being captured, a successor imaging location can be manually loaded with a second set of multiple target images for automatic capture following the first set. Such a mechanism further facilitates high-volume digital imaging, and may help further lower the cost of digitization products. More specifically, a first position is represented in FIG. 3B by numeral 351, with an imaging area divided into plural target image locations (such as two locations, 359 and 361). In FIG. 3B, the first of these locations 359 is seen as positioned directly over the imaging system, represented by numeral 353. While the first location is being imaged, a second location 361 can be loaded with a second set of target images or pages as mentioned. When image capture of the first set is complete, a platen or other image mounting device 355 is then moved as indicated by directional arrows 357 so as to position the second imaging area over the imaging system 353. This second position is represented by FIG. 3C, and is labeled using numeral 371.

Figure 4:
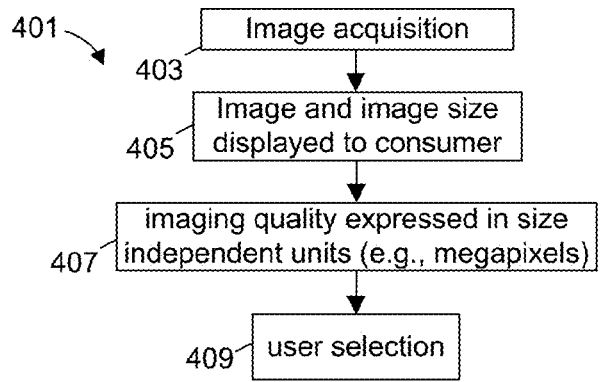
FIG. 4 an optional design where image quality is converted to metric independent of hardcopy dimensions.

FIG. 4 provides additional detail on a method of providing digitization services or image capture service to a consumer which avoids some of the confusion mentioned earlier. In providing digitizing service for still images from prints, existing scanner technology typically uses a fixed capture resolution per inch, which in turn produces an output description of "dots per inch" which can be confusing to users. While translation tables can permit customers to translate from "dots per inch" to "megapixels depending on print size," it is still difficult for a consumer to understand whether there is sufficient resolution for the consumer's needs, or excessive resolution (leading to unnecessarily large digital files).

This problem is exacerbated when a self-service digitizing service is offered inside a retail store. In a self-service environment, the service typically should be intuitive. Consumers have an expectation of a fixed resolution measured by megapixels, and a table of translation from "dots per inch" to "megapixels" is almost certainly too complicated to communicate. By using a digital camera with zoom technology to capture images within a larger print or photoalbum, for example, a selected image is inherently scaled to the size of the array of the image capture device, expressed in terms of megapixels. This then provides an immediately quality metric usable by the consumer. In one embodiment, therefore, this metric is directly selectable by the consumer, with the imaging device using control over (a) operating parameters of the array (e.g., 8 megapixels versus 24 megapixels), (b) post-capture digital filtering of digital image resolution (e.g., downconverting 24 megapixels to 8 megapixels), (c) discrimination between multiple image capture device (e.g., multiple CCDs, or multiple alternative digital cameras mounted within the imaging product) or (d) other parameters, so as to vary the amount of captured digital data.

This is expressed in part by FIG. 4. Numeral 401 represents a general method of digitization where an image is first acquired by a digital camera or equivalent, per numeral 403. The image and image size can be graphically displayed to the consumer or a retail store employee, per numeral 405, for example, via an LCD screen. Per numeral 407, image quality is expressed in hardcopy-independent units, that is, in megapixels or another metric that is not dependent on the physical dimensions of the material being digitized. A consumer then makes a selection, per numeral 409; if desired, the displayed image can be re-rendered to reflect the selected image quality, and accompanied by a price (if used in connection with a service bureau for digitization services). Finally, once the user confirms the selection, the captured image can be output, for example, uploaded, produced in hardcopy, written to disc or other non-transitory media, or otherwise output.

Figure 6:
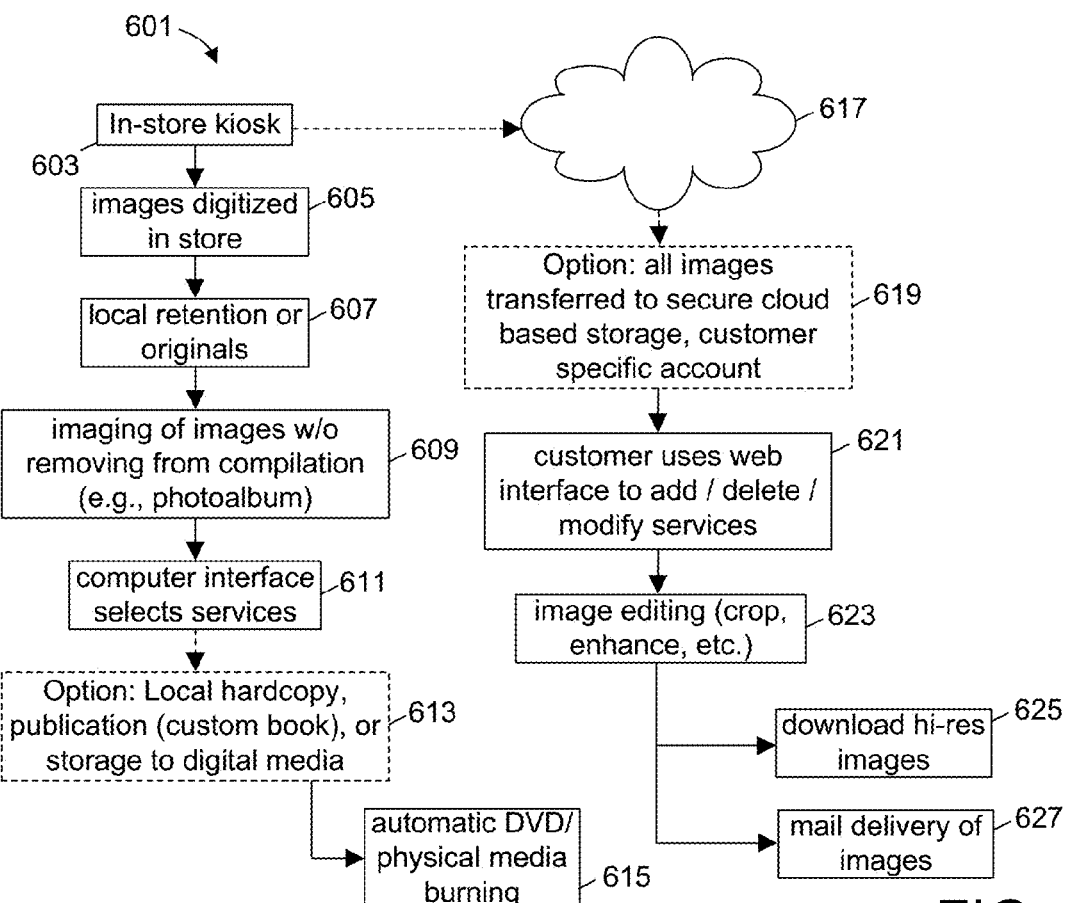
FIG. 6 is an illustrative diagram that shows two different implementations of a kiosk-based imaging system, including in a retail store environment (represented by box 613 at the left side of FIG. 6) and as part of a "cloud-based" implementation, represented by numerals 617 and 619 at the right side of FIG. 6.
Figure 5A:
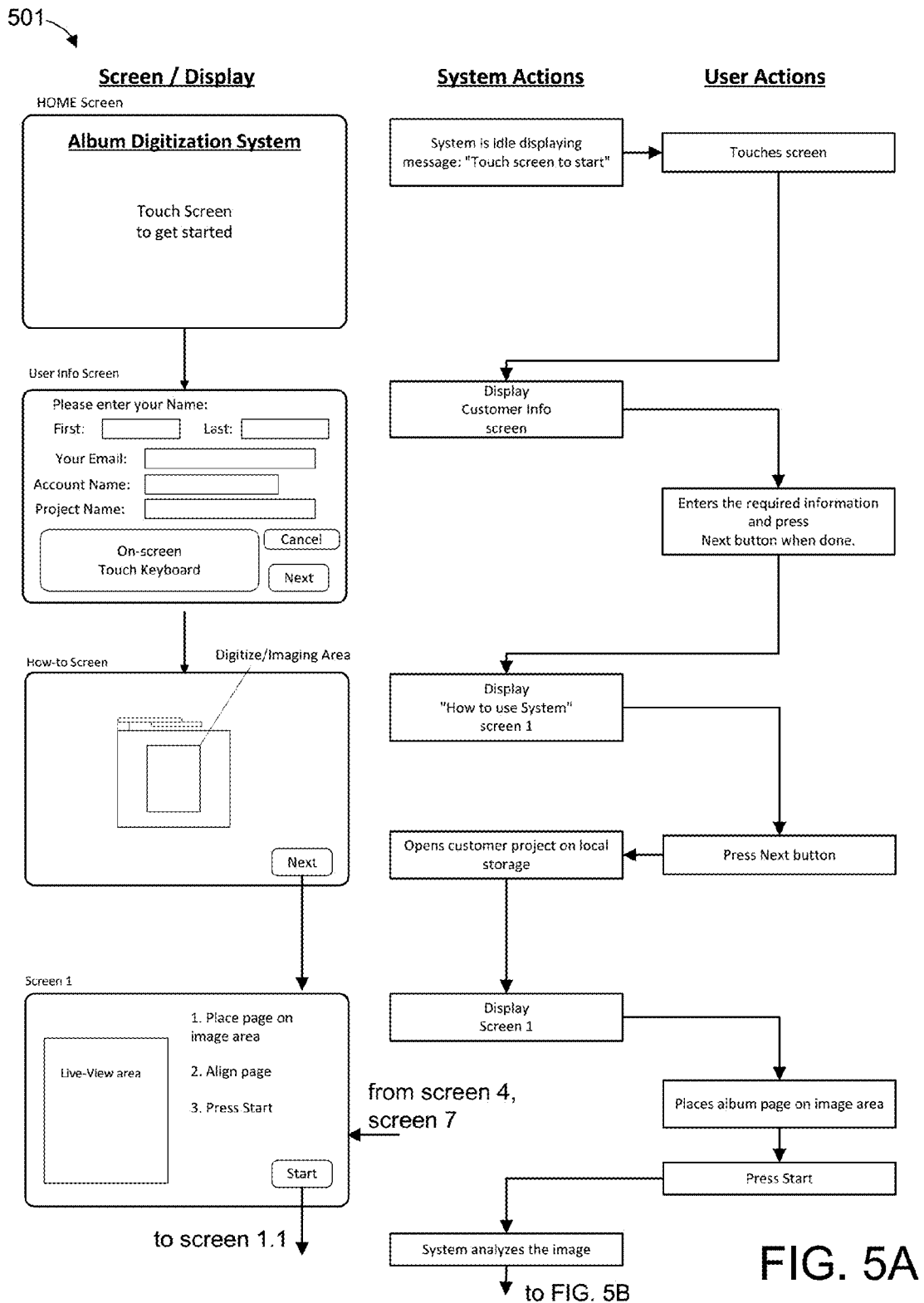
FIGS. 5A-5C collectively represent a single figure, broken across several drawing pages, that depicts a workflow associated with local imaging kiosks. That is, FIG. 5A contains a first portion 501 of the workflow, FIG. 5B contains a second portion 503 of the workflow, and FIG. 5C contains a third portion 505 of the workflow.
Figure 5B:
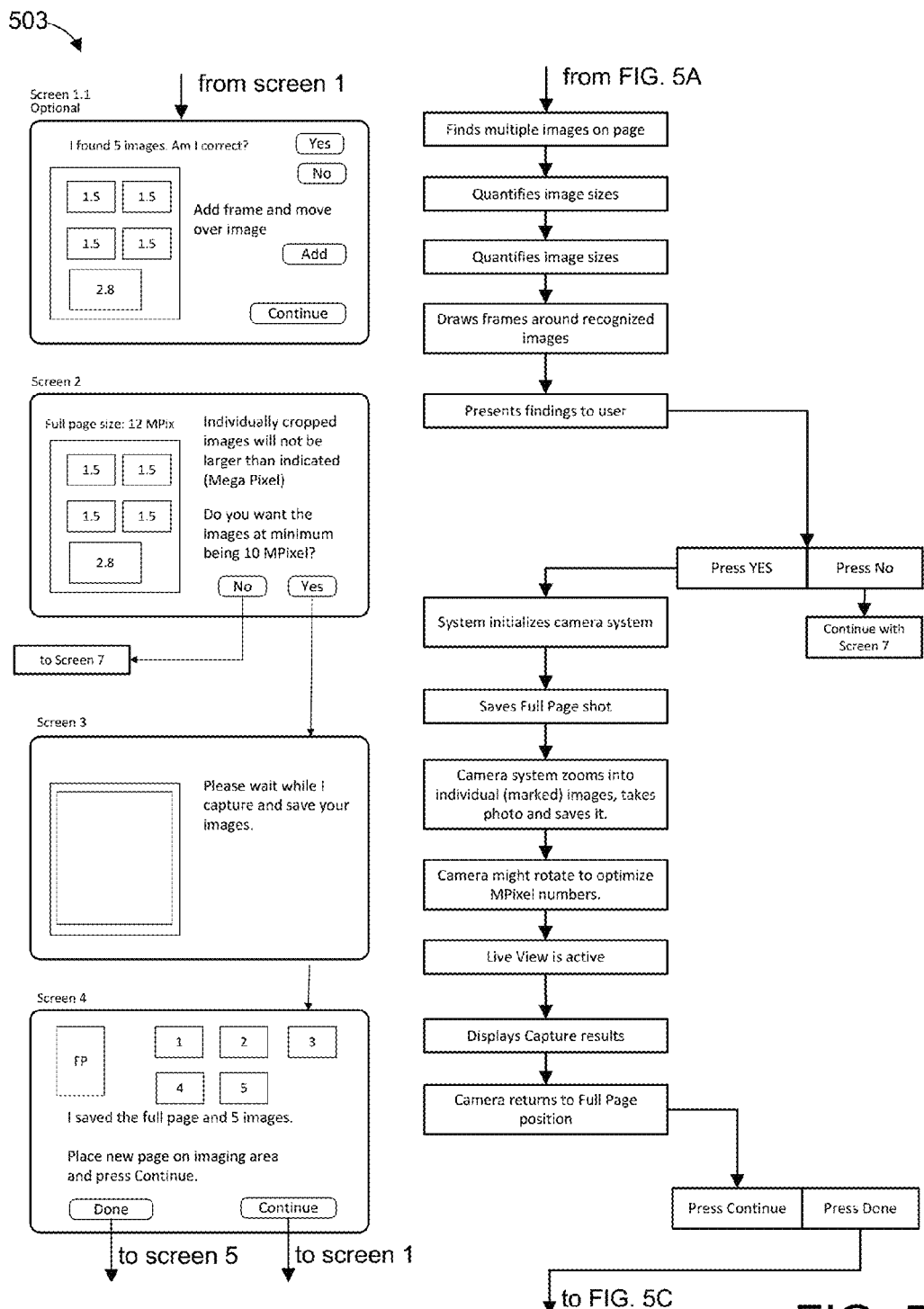
Figure 5C:
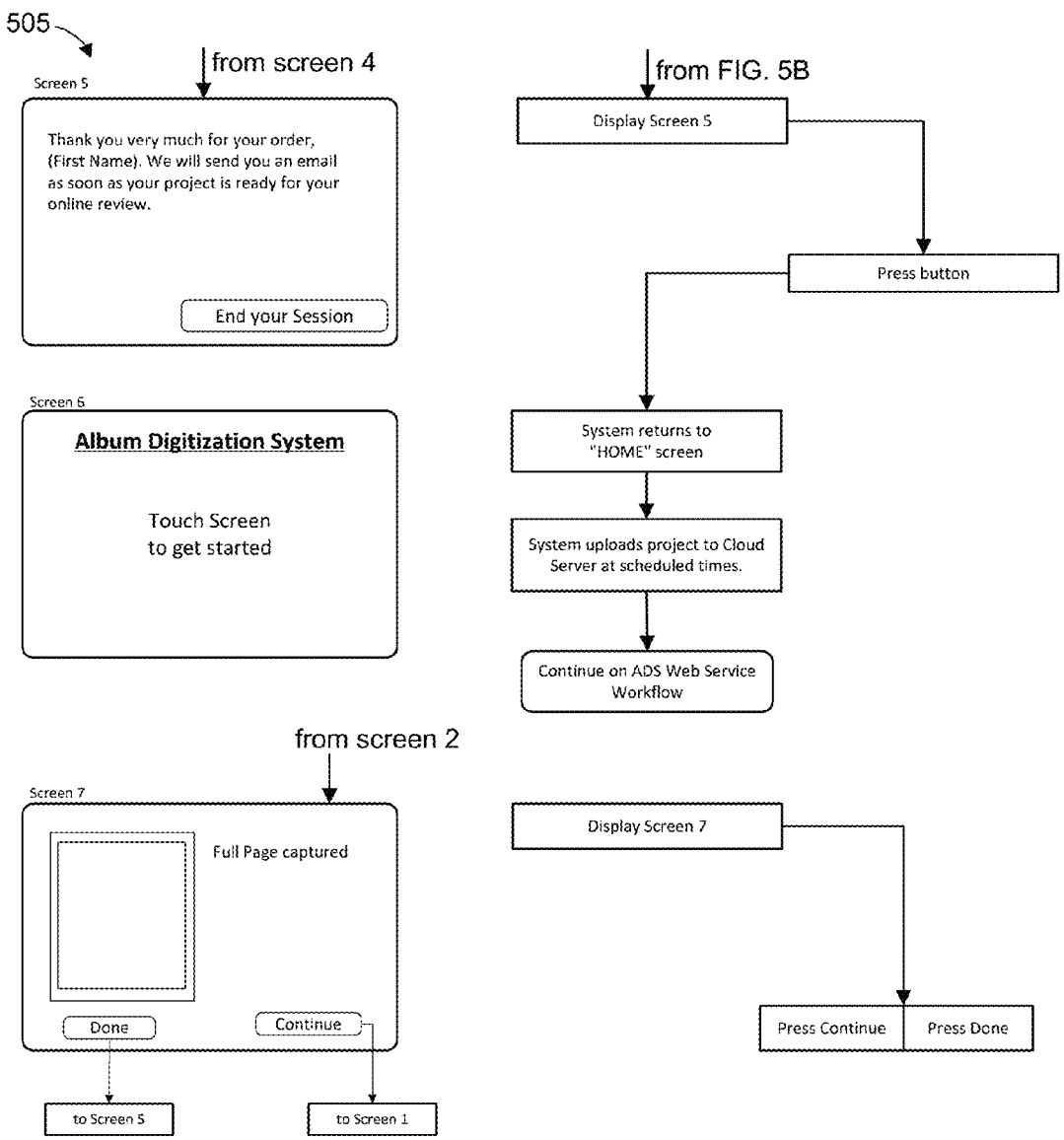

FIGS. 5 and 6 are use to describe service bureau implementations and options, for example, methods of doing business based on the technology introduced above. As mentioned, one embodiment provides the imaging product in the form of a digitizing kiosk, which for example can be installed in retail stores such as drug stores, membership clubs, photo specialty shops and other locations. The kiosk can be predicated on the design of the imaging product seen in FIG. 1, and can be configured for either direct consumer use or for operation by a store employee. For example, a consumer can deliver photos to a photo counter at a store during shopping and can later retrieve the photos at time of departure. A kiosk such as described above, permits retail stores to directly offer high quality digitization services, that is without having to ship photos and other materials to a remote destination for scanning FIG. 5 exemplifies the workflow that might be presented to a retail store employee or to a consumer operating a self-service kiosk. FIG. 5 is divided into three subfigures, 5A-5C, broken across several drawing pages; FIG. 5A contains a first portion 501 of the workflow, FIG. 5B contains a second portion 503 of the workflow, and FIG. 5C contains a third portion 505 of the workflow.

FIG. 6 is used to explain a number of business models that can be used in concert with the workflow of FIG. 5. That is, as depicted by numeral 601, an in-store kiosk 603 can be used to provide local digitization services. As indicated by numerals 605, 607 and 609, such a service provides the benefits of (1) local retention of the originals (e.g., the consumer can take them home at the end of the day, or can supervise imaging to alleviate privacy concerns), (2) without having to dismantle a photoalbum or remove individual photos from album pages. The in-store kiosk operates in the manner described either, that is with suitable control over lighting and image capture, to automatically yield high-quality digital images. If desired, quality level can be made selective to the consumer as described earlier. Advantageously, the in-store kiosk either possesses or is coupled to a computer interface that permits the consumer or a store employee to select services and have those services automatically performed.

FIG. 6 presents two different business models, generally represented by numerals 613 and 617, respectively. That is, as indicated by numeral 613, the retail store (or the kiosk) can provide image reproduction features, publication services such as custom book design and real-time binding and printing services, and other digital media services. To illustrate several examples, in one embodiment, a consumer can view a capture image, have that image enhanced, and obtain (e.g., purchase) a high quality image hardcopy on photographic paper. The image may have color correction, gamma correction, noise reduction, or other forms of image processing performed real-time to create that hardcopy. On the other hand, the consumer might desire to obtain a bound book of photos; once the photos are digitized, the consumer can subjectively lay these photos out, add captions and other features. The kiosk (and/or other local services) can provide for a local machine print and binding or other publication of a custom book, calendar, etc. Finally, as indicated by numeral 615, if the user simply wants digitized copies of images, digitization may be performed (e.g., in bulk if desired) with digitized images burned on-site to create an optical disc (CD, DVD, BD) or other digital copy of images, which the consumer then takes home.

Numeral 617 represents a cloud-based services model. That is, images can be transferred via a wide area network (WAN) (e.g., such as via the Internet) to an on-line site, "in the cloud." The consumer can then select either using the kiosk's interface or from the comfort of the consumer's home a suite of services, with payment being made via the Internet. For example, as represented by numerals 619, 621 and 623, the consumer can have secure mass storage services provided for his or her media, online, in a manner associated with a secure consumer account. The consumer can then selectively share that media, or can add, delete or modify services provided via the "cloud." The consumer can also use a web interface of the services provider to edit (e.g., crop, enhance or otherwise process) images, and observe corrected images in real time. Whether provided for free or for an extra fee, the consumer can then be allowed to selectively download high resolution images, or obtain mail delivery of hardcopy images, such as high quality prints, books or other materials, all as introduced earlier.

CONCLUSION

It should be apparent that by providing a low cost imaging technology based on digital cameras, the technology provided above greatly facilitates the ease of which photos, photoalbums and other materials can be digitized. That is, digitization services can be performed with reduced privacy concerns and without requiring consumers to part with valuable originals for weeks on-end. In addition, by providing a specific imaging device, with a footprint comparable to conventional office printers, the technology presented above permits widespread instantiation of digitization services at a wide variety of retail locations. For those locations unwilling or unable to provide support services (e.g., printing of photographs), kiosks can either be made self-contained or made to automatically interface with "cloud-based" services accessible to the consumer at any time.

What has been described is a set of methods and systems design to facilitate low cost digitization of materials, particular photoalbums and other compilations of materials. Other applications will readily occur to those who design electronics or software in view of the teachings provided above, or in view of the invention defined by the claims set forth below. Accordingly, the foregoing discussion is intended to be illustrative only; other designs, uses, alternatives, modifications and improvements are also possible which are nonetheless within the scope of the present disclosure, which is limited and defined only by the following claims and equivalents thereto.

What is claimed is:

1. A method for automatically locating and capturing content for distribution comprising:
   providing a mechanism to mount a document local to a user in possession of the document, wherein the document includes plural distinct images;
   illuminating the mounted document;
   processing the mounted document, including automatically locating and digitally capturing the plural images from the mounted document, the locating including using automatic image identification to detect a presence within the mounted document of each distinct image of the plural images, the processing including, for each distinct image of the plural images:
      automatically identifying a distinct image included in the mounted document including locating the distinct image in the mounted document and positioning a camera relative to a location associated with the distinct image; and
      automatically digitally capturing a portion of the mounted document, wherein the portion is less than an entirety of the mounted document;
   wherein automatically digitally capturing the portion of the mounted document includes capturing an entirety of the distinct image;
   wherein automatically identifying the distinct image further includes automatically locating a plurality of separate images in the mounted document, and automatically selecting the distinct image from among the located images followed by a second different image from among the located images,
   wherein automatically digitally capturing each image further includes automatically positioning a digital camera over a first image to enable capture of the first image and then automatically positioning the digital camera over a second image to enable capture of the second different image, wherein automatically capturing includes automatically adjusting a zoom of the digital camera to capture just a respective selected individual image which comprises a selected portion and wherein the document comprises a single page, and
   wherein positioning the digital camera for each distinct image includes adjustably positioning the digital camera relative to each identified distinct image relative to the digital camera in a plane normal to an optical axis of the digital camera including adjustably positioning in both an x and y axis defined by the plane; and
   transmitting the plural images captured from the document to a remote network destination for further processing.

2. The method of claim 1, further comprising feeding the first document from a feed location to a location where the first image can be located and digitally captured and exchanging a second document for the first document, the digitizing apparatus operable to retain and image a single image included in the second document.

3. The method of claim 1 further comprising manipulating one of the document or the digital camera so that an optical axis of image capture of the digital camera is in alignment with a detected image within the document and wherein once manipulated, the lens is automatically manipulated to zoom in or out on the detected image, wherein the detected image does not occupy an entire portion of the document and wherein a control mechanism is operable to select the detected image as the selected portion.

4. The method of claim 1 further comprising automatically detecting an image that is included in a first portion of the document and wherein the document is a single page and includes plural portions each including less than an entire portion of the document, and automatically adjusting positioning of a carriage to manipulate in two axes defining a plane at least one of the digital camera or the document wherein the plane is normal to the optical axis so as to be able to capture just the first portion without capturing other portions of the plurality of portions of the document.

5. The method of claim 1 wherein illuminating further includes diffusing light generated by a light source that is incident on the document.

6. The method of claim 1 wherein illuminating further includes filtering light generated by the light source that is incident on the document.

7. The method of claim 6 wherein filtering includes using first and second polarizing filters in an optical path between the light source and the document.

8. The method of claim 7 including varying a polarization of the first and second polarizing filters to permit variation of corresponding polarization, so as to permit adjustment of light filtered by a combination of the first and second polarizing filters.

9. The method of claim 1 further comprising storing digital files representing captured images.

10. The method of claim 1 further comprising providing an external user interface adapted to provide for user control over zoom.

11. The method of claim 1 further comprising locally printing local reproductions of captured images.

12. The method of claim 1, where the remote network destination is a web site of a third party service provider.

13. The method of claim 1 further comprising presenting representations of captured images and receiving user input regarding quality of image capture required and automatically adjusting zoom based on the received input to re-capture a given image at a different level of zoom or resolution.

14. The method of claim 1 wherein capturing includes taking a digital image using a camera as opposed to scanning a respective image.

15. The method of claim 1 further comprising generating clean images with appropriate balance and color correction based on captured images and wherein transmitting comprises transmitting the clean images.

16. The method of claim 1 further comprising automatically varying a depth of field when capturing the first image as compared to capturing the second image.

17. The method of claim 1 further comprising automatically capturing the first image and the second image at multiple levels of abstraction, wherein the levels of abstraction are selected from the group comprising page, section of page, image within a page, text, image with a section or image within an image.

18. The method of claim 1 wherein automatically capturing includes capturing the first and second image at a first resolution, and down-sampling captured images to a second lesser resolution for presentation to the user or for further processing.

19. A digitizing apparatus, comprising:
a housing;
a mechanism operable to mount a document;
a light source within the housing, the light source adapted to illuminate the document;
an imaging system within the housing, the imaging system comprising at least an image sensor and a lens, the image sensor adapted to digitally capture a portion of the document, wherein the document is a page of an album and the page includes a plurality of individual images, the imaging system adapted to identify each image in the plurality of individual images, select a first image of the plurality of individual images, position the image sensor over the first image, automatically zoom to select a portion of the document that includes the first image but does not include other images of the plurality of images, capture a digital representation of the first image and repeat the positioning, zooming and capturing for a second image of the plurality of images; and
a processing system within the housing to store and process captured images wherein processing is selected from the group comprising locally printing or presenting the captured images to a user, or transmitting captured images to a web service for further processing, the processing system processing the mounted document, including automatically locating and digitally capturing plural images from the mounted document, the locating including using automatic image identification to detect a presence within the mounted document of each distinct image of the plural images, the processing including, for each distinct image of the plural images:
automatically identifying a distinct image included in the mounted document including locating the distinct image in the mounted document and positioning a camera relative to a location associated with the distinct image; and
automatically digitally capturing a portion of the mounted document, wherein the portion is less than an entirety of the mounted document;
wherein automatically digitally capturing the portion of the mounted document includes capturing an entirety of the distinct image;
wherein automatically identifying the distinct image further includes automatically locating a plurality of separate images in the mounted document, and automatically selecting the distinct image from among the located images followed by a second different image from among the located images,
wherein automatically digitally capturing each image further includes automatically positioning a digital camera over a first image to enable capture of the first image and then automatically positioning the digital camera over a second image to enable capture of the second different image, wherein automatically capturing includes automatically adjusting a zoom of the digital camera to capture just a respective selected individual image which comprises a selected portion and wherein the document comprises a single page, and
wherein positioning the digital camera for each distinct image includes adjustably positioning the digital camera relative to each identified distinct image relative to the digital camera in a plane normal to an optical axis of the digital camera including adjustably positioning in both an x and y axis defined by the plane.

20. The digitizing apparatus of claim 19 further comprising a user interface that provides an interface to the user for presenting initial captured images at an automatically determined level of zoom, and accepts user input to adjust the level of zoom to affect a different user selectable zoom to select a different portion of the document.

* * * * *